(12) United States Patent
Lenssen et al.

(10) Patent No.: US 7,821,701 B2
(45) Date of Patent: Oct. 26, 2010

(54) ELECTROPHORETIC DISPLAY WITH HOMOGENEOUSLY DISTRIBUTED ELECTRICALLY CHARGED PARTICLES

(75) Inventors: Kars-Michiel Lenssen, Veldhoven (NL); Ed Niessen, Ittervoort (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 116 days.

(21) Appl. No.: 12/303,265

(22) PCT Filed: Apr. 11, 2007

(86) PCT No.: PCT/IB2007/051303
§ 371 (c)(1),
(2), (4) Date: Dec. 3, 2008

(87) PCT Pub. No.: WO2008/004140
PCT Pub. Date: Jan. 10, 2008

(65) Prior Publication Data
US 2009/0251762 A1    Oct. 8, 2009

Related U.S. Application Data

(60) Provisional application No. 60/806,292, filed on Jun. 30, 2006.

(51) Int. Cl.
*G02B 26/00* (2006.01)
*G09G 3/34* (2006.01)

(52) U.S. Cl. .................. 359/296; 345/107
(58) Field of Classification Search ............... 359/296; 345/107; 430/32; 204/600
See application file for complete search history.

(56) References Cited

U.S. PATENT DOCUMENTS 6,879,430 B2 * 4/2005 Machida et al. ......... 359/296
2002/0151246 A1 10/2002 Ikeda et al.
2003/0117016 A1 6/2003 Ukigaya

FOREIGN PATENT DOCUMENTS

| JP | 01177517 A | 7/1989 |
|---|---|---|
| JP | 2003322879 A | 11/2003 |
| JP | 2004020640 A | 1/2004 |
| WO | WO2004008238 A1 | 1/2004 |

* cited by examiner

*Primary Examiner*—William C Choi

(57) ABSTRACT

An electrophoretic display device employs an electrophoretic display (100) and a display driver (110). The electrophoretic display (100) includes a matrix of display elements (30,40, 50; P00-P99), and the display driver (110) establishes a homogenous distribution of electrically charged particles among the display elements (30,40,50; P00-P99), based on one or more generations of an in-plane electric force (INEF) for moving a homogeneous batch of electrically charged particles between two or more display elements (30,40,50; P00-P99).

15 Claims, 15 Drawing Sheets

130

| P00 | P01 | P02 | P03 | P04 | P05 | P06 | P07 | P08 | P09 |
| P10 | P11 | P12 | P13 | P14 | P15 | P16 | P17 | P18 | P19 |
| P20 | P21 | P22 | P23 | P24 | P25 | P26 | P27 | P28 | P29 |
| P30 | P31 | P32 | P33 | P34 | P35 | P36 | P37 | P38 | P39 |
| P40 | P41 | P42 | P43 | P44 | P45 | P46 | P47 | P48 | P49 |
| P50 | P51 | P52 | P53 | P54 | P55 | P56 | P57 | P58 | P59 |
| P60 | P61 | P62 | P63 | P64 | P65 | P66 | P67 | P68 | P69 |
| P70 | P71 | P72 | P73 | P74 | P75 | P76 | P77 | P78 | P79 |
| P80 | P81 | P82 | P83 | P84 | P85 | P86 | P87 | P88 | P89 |
| P90 | P91 | P92 | P93 | P94 | P95 | P96 | P97 | P98 | P99 |

FIG. 13

ELECTROPHORETIC DISPLAY WITH HOMOGENEOUSLY DISTRIBUTED ELECTRICALLY CHARGED PARTICLES

Cross Reference to Related Cases

Applicants claim the benefit of International Application Number PCT/IB2007/051303, filed Apr. 11, 2007, and Provisional Application Serial No. 60/806,292, filed Jun. 30, 2006.

The present invention generally relates to an electrically charged particle homogenization of an electrophoretic display operable to generate in-plane electrical fields within an electrophoretic suspension of the electrophoretic display. The present invention specifically relates to an electrical driving technique for a designed utilization of in-plane electric fields within an electrophoretic suspension of an electrophoretic display for purposes of setting or resetting a homogenous distribution of electrically charged particles of the electrophoretic display.

FIGS. 1 and 2 illustrate a top substrate 20, a bottom substrate 21 and an electrophoretic suspension 22 of electrically charged particles between substrates 20 and 21 supporting three (3) display elements in the form of pixels 30, 40 and 50. Pixel 30 is defined by a pair of in-plane electrodes 31 and 32 and a reflector 33 disposed within electrophoretic suspension 22 between substrates 20 and 21. Pixel 40 is defined by a pair of in-plane electrodes 41 and 42 and a reflector 43 disposed within electrophoretic suspension 22 between substrates 20 and 21. Pixel 50 is defined by a pair of in-plane electrodes 51 and 52 and a reflector 53 disposed within electrophoretic suspension 22 between substrates 20 and 21. Ideally, a distribution of electrically charged particles of electrophoretic suspension 22 among pixels 30, 40 and 50 is constantly homogenous as shown in FIG. 1 by the equal number of black dots within pixels 30, 40 and 50. However, in practice, the distribution of electrically charged particles of electrophoretic suspension 22 among pixels 30, 40 and 50 typically will not be homogeneous as shown in FIG. 2 by the unequal number of black dots within pixels 30, 40 and 50.

One solution to establishing and maintaining a homogeneous distribution of electrically charged particles among pixels is to manufacture microcups for the electrophoretic display. For example, as shown in FIG. 3, a top substrate 60 and a bottom substrate 64 having upward extending side walls create microcups 70, 80 and 90. Microcup 70 defines a display element in the form of a pixel having a pair of in-plane electrodes 71 and 72 and a reflector 73 disposed within an electrophoretic suspension 74 of a homogenization quantity of electrically charged particles. Microcup 80 defines a display element in the form of a pixel having a pair of in-plane electrodes 81 and 82 and a reflector 83 disposed within an electrophoretic suspension 84 of a homogenization quantity of electrically charged particles. Microcup 90 defines a display element in the form of a pixel having a pair of in-plane electrodes 91 and 92 and a reflector 93 disposed within an electrophoretic suspension 94 of a homogenization quantity of electrically charged particles. While this solution resolves the homogenization of electrically charged particles among the pixels, the manufacture of microcups has proven to be very limited in its application to electrophoretic displays.

The present invention provides a new and unique electrophoretic display incorporating an electrical driving technique for setting or resetting a homogenous distribution of electrically charged particles of the electrophoretic display.

In a first form of the present invention, the electrophoretic display device comprises a matrix of display elements and a display driver in electrical communication with the display elements to establish a homogenous distribution of electrically charged particles among the display elements based on one or more generations of an in-plane electric force for moving a homogeneous batch of electrically charged particles between two or more display elements. The various possible motions of the homogeneous batch of electrically charged particles between the display elements exemplary includes a swirling motion and a linear motion.

In a second form of the present invention, the electrophoretic display device comprises a matrix of display elements, an electrophoretic suspension of electrically charged particles in fluid communication with at least one of the display elements and a display driver in electrical communication with the display elements to establish a homogenous distribution of electrically charged particles among the display elements based on one or more generations of an in-plane electric force for moving a homogeneous batch of electrically charged particles between the electrophoretic suspension reservoir and one or more display elements. The various possible motions of the homogeneous batch of electrically charged particles between the electrophoretic suspension reservoir and the display element(s) exemplary includes a linear motion.

The foregoing forms and other forms of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

FIG. 13 illustrates an exemplary image resolution of the electrophoretic display illustrated in FIG. 9 in accordance with the present invention;

The present invention is premised on a generation of an in-plane electric force for moving a homogenous portion of electrically charged particles between two or more display elements, or between an electrophoretic suspension reservoir and one or more display elements. For purposes of the present invention, the term "in-plane electric force" is broadly defined herein as a single electric field or a series of electric fields for moving a homogeneous batch of electrically charge particles between two or more display elements, or between an electrophoretic suspension reservoir and one or more display elements by either (1) electrically attracting the homogenous portion of electrically charged particles to one display element from another display element and/or the electrophoretic suspension reservoir, and/or (2) repulsing the homogenous portion of electrically charged particles from one display element or the electrophoretic suspension reservoir to another display element. Further, the term "homogeneous batch of electrically charged particles" is broadly defined herein as a divided quantity, size or magnitude of electrically charged particles for substantially establishing a homogeneous distribution of the electrically charged particles among a plurality of display elements in a matrix, a line of a matrix (e.g., a row or a column of the matrix) or a cluster of a matrix. This definition of "homogeneous batch of electrically charged particles" excludes the unavoidable sporadic movement of one or more electrically charged particles between pixels during the operational life time of an electrophoretic display.

Figure 4:
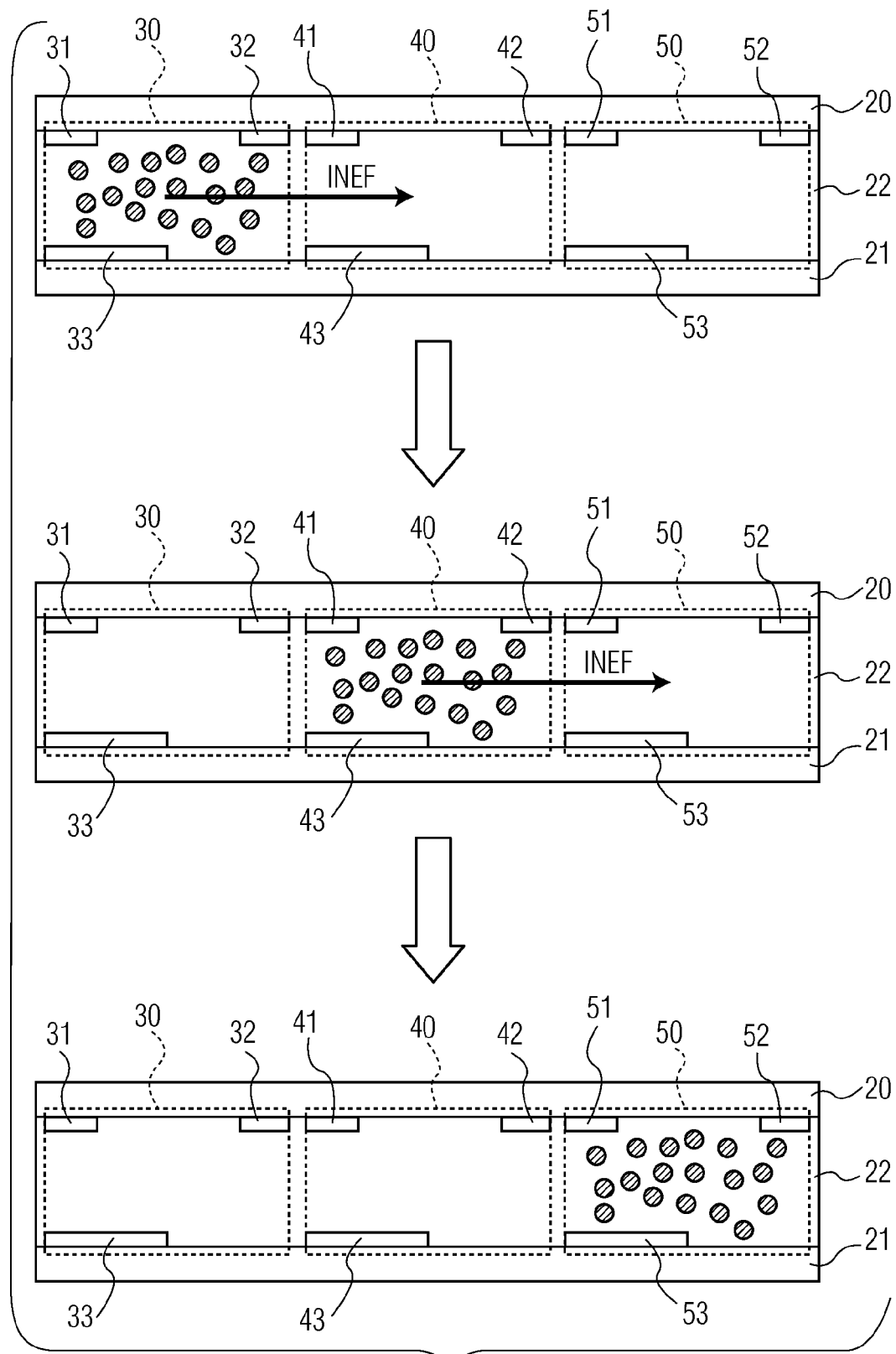
FIGS. 4 and 5 illustrate an exemplary linear motion of an homogeneous batch of electrically charged particles between three (3) pixels of an electrophoretic display in accordance with the present invention.

For example, FIG. 4 illustrates a generation of an in-plane electric force ("INEF") for moving a homogenous portion of electrically charged particles between pixel 30 and pixel 50. Specifically, a series of electric fields (not shown) are generated via the electrodes to electrically attract the homogenous portion of electrically charged particles to pixel 40 from pixel 30 and then to pixel 50 from pixel 40 and/or to electrically repulse the homogenous portion of electrically charged particles from pixel 30 to pixel 40 and then from pixel 40 to pixel 50. To generate the in-plane electric force, in one embodiment an electrode series of 31-32-41-42-51-52 are driven by attractive and/or repulsive voltages that are alternated spatially with a polarity that is reversed at a frequency that is chosen to sequentially move the homogenous portion of electrically charged particles to the "next electrode" within the electrode series of 31-32-41-42-51-52 until such time the homogenous portion of electrically charged particles settles within pixel 50.

Figure 5:
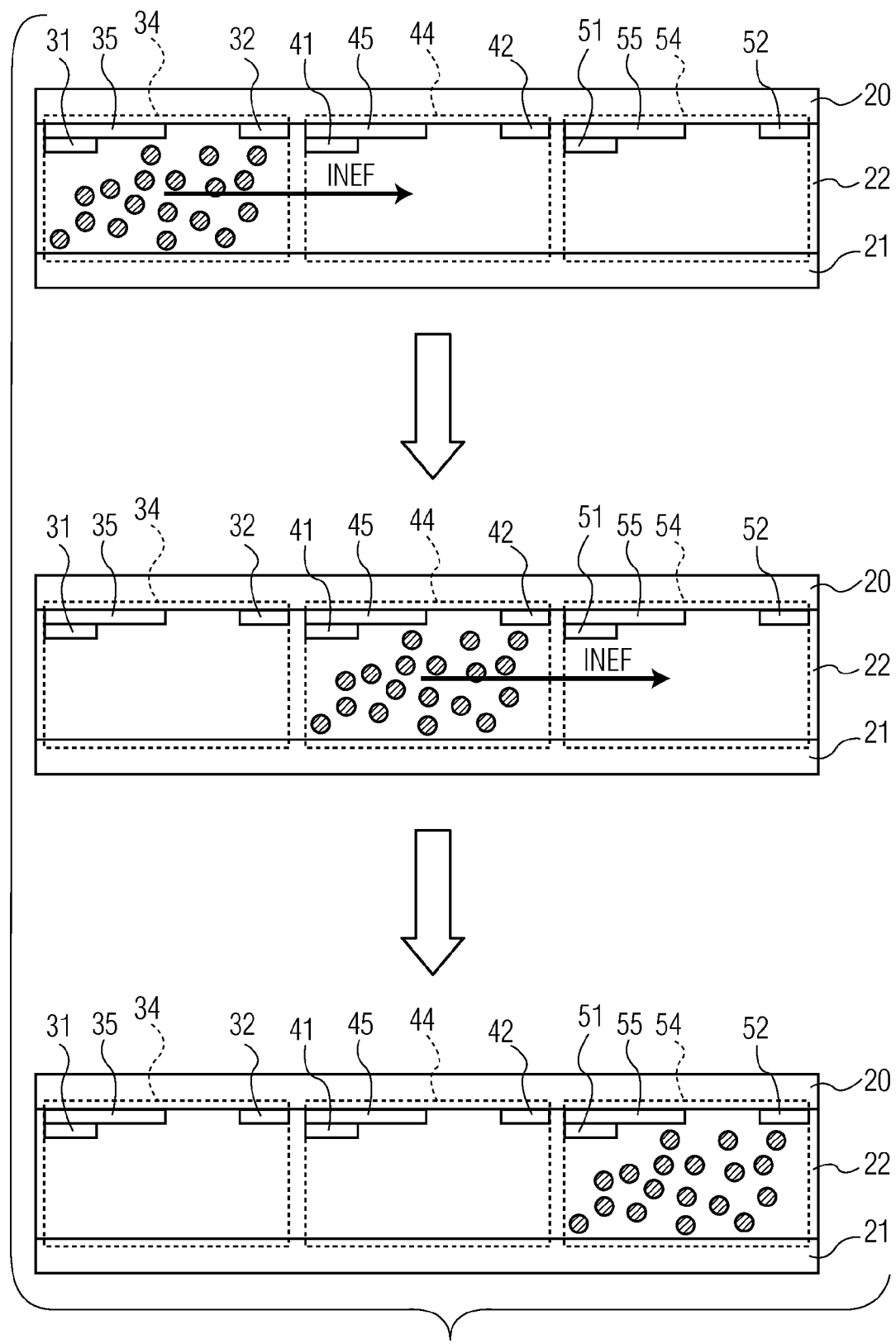

Similarly, FIG. 5 illustrates a pixel 34 defined by in-plane electrodes 31 and 32 and a light shield 35 (e.g., a black mask) disposed within electrophoretic suspension 22 between substrates 20 and 21, a pixel 44 defined by in-plane electrodes 41 and 42 and a light shield 45 disposed within electrophoretic suspension 22 between substrates 20 and 21, and a pixel 55 defined by in-plane electrodes 51 and 52 and a light shield 55 disposed within electrophoretic suspension 22 between substrates 20 and 21. Similarly, a generation an in-plane electric force ("INEF") moves a homogenous portion of electrically charged particles between pixel 34 and pixel 54. Specifically, a series of electric fields (not shown) are generated via the electrodes to electrically attract the homogenous portion of electrically charged particles to pixel 44 from pixel 34 and then to pixel 54 from pixel 44 and/or to electrically repulse the homogenous portion of electrically charged particles from pixel 34 to pixel 44 and then from pixel 44 to pixel 54. Again, to generate the in-plane electric force, in one embodiment the electrode series of 31-32-41-42-51-52 are driven by attractive and/or repulsive voltages that are alternated spatially with a polarity that is reversed at a frequency that is chosen to sequentially move the homogenous portion of electrically charged particles to the "next electrode" within the electrode series of 31-32-41-42-51-52 until such time the homogenous portion of electrically charged particles settles within pixel 54.

In practice, those having ordinary skill in the art will appreciate that the generation of an in-plane electric force is dependent upon numerous factors, including, but not limited to, (1) a type of solvent within the electrophoretic suspension, (2) a type and a size of each electrically charged particle, (3) a concentration of electrically charged particles within a display element, and (4) an intensity, a distribution and a direction of the electrical field(s) being applied to a display element via the electrodes. Thus, the present invention does not limit nor restrict how an in-plane electric force is generated for purposes of moving a homogenous portion of electrically charged particles between pixels or between an electrophoretic suspension reservoir and pixel(s). Nonetheless, to facilitate a further understanding of the present invention, FIGS. 6-16 herein describes exemplary embodiments of an electrophoretic display device of the present invention and methods for a homogenization of the electrically charged particles of electrophoretic displays. From this description, those having ordinary skill in the art will appreciate how to employ the inventive principles of the present invention for the manufacture and operation of a variety electrophoretic display devices in accordance with the present invention.

Figure 6:
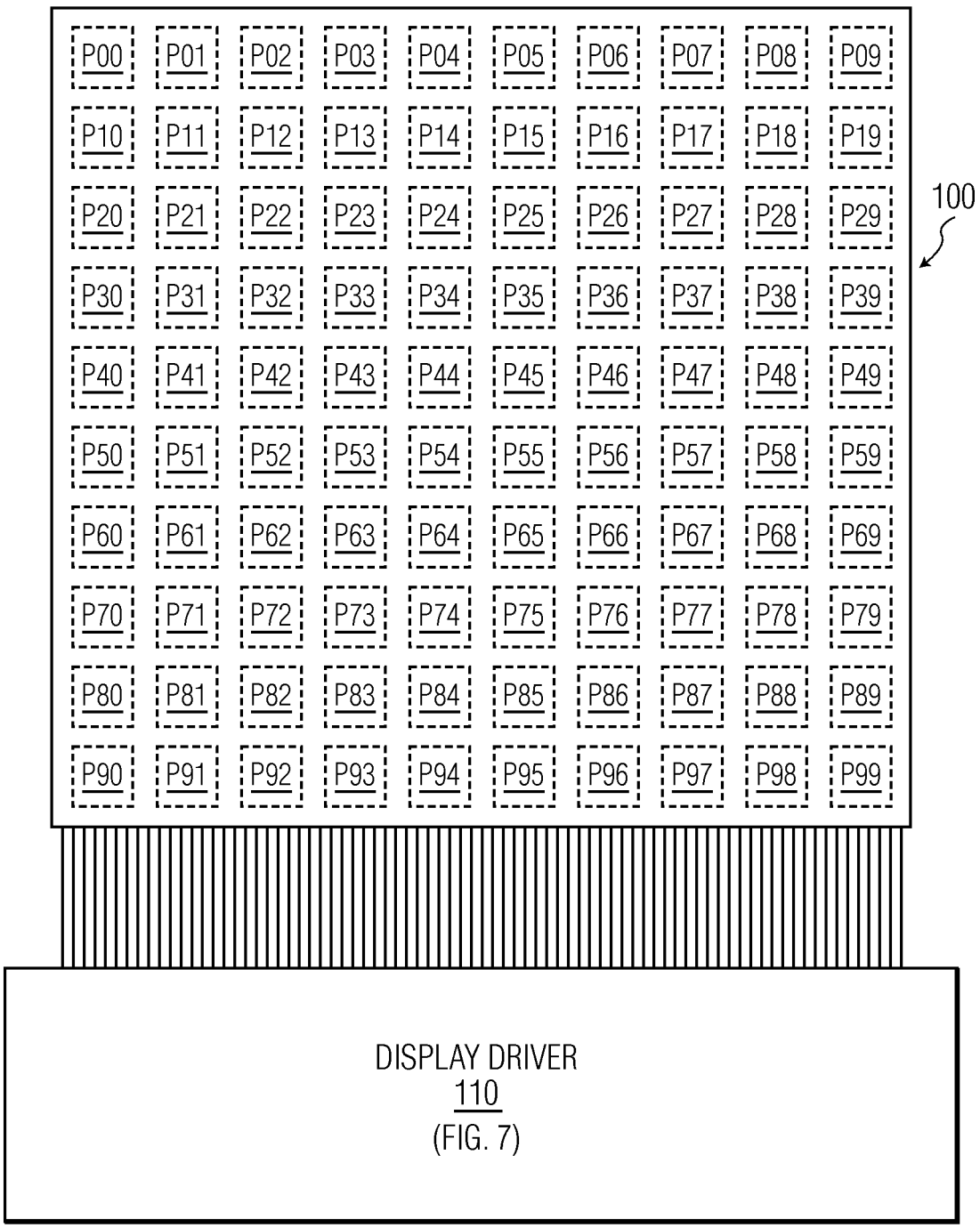
FIG. 6 illustrates a first embodiment of an electrophoretic display device in accordance with the present invention; to FIG. 7 illustrates a flowchart representative of one embodiment of a swirling motion particle homogenization method in accordance with the present invention.

FIG. 6. illustrates an electrophoretic display 100 and a display driver 110. Electrophoretic display 100 employs a 10 row by 10 column matrix of display elements in the form of pixels P00-P99 of any configuration as would be appreciated by those having ordinary skill in the art for supporting a generation of an in-line electric force of the present invention (e.g., pixel 30 shown in FIG. 4 and pixel 34 shown in FIG. 5). Display driver 110 is in electrical communication with pixels P00-P99 via drive elements (not shown) as would be appreciated by those having ordinary skill in the art (e.g., transistors and capacitors). In operation, display driver 110 is structurally configured with hardware, software and/or firmware to implement a flowchart 120 illustrated in FIG. 7 that is representative of a swirling motion homogeneous distribution method of the present invention for establishing a homogeneous distribution of electrically charged particles among pixels P00-P99.

Figure 7:
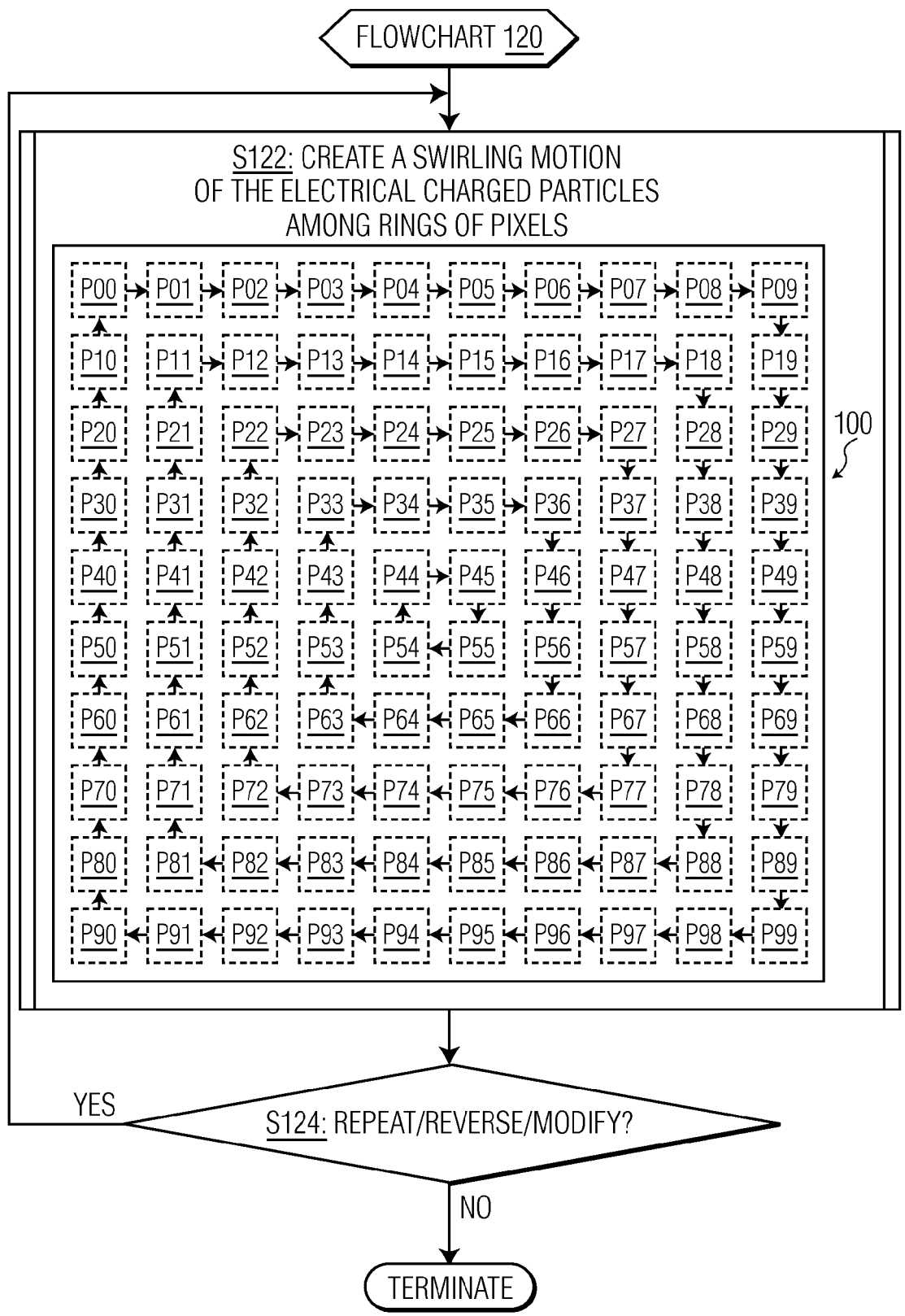

Referring to FIG. 7, a stage S122 of flowchart 120 encompasses display driver 110 creating a swirling motion of the electrical charged particles among pixels P00-P99 as exemplary illustrated by the clockwise motion arrows shown among the five (5) pixel rings in electrophoretic display 100. To this end, in one embodiment, display driver 110 applies voltages to an electrode series of each ring of pixels in a manner that moves the electrically charged particles in a clockwise direction as evidenced by the clockwise motion arrows that may involve a degree of mixing of particles between pixels rings (not shown).

A stage S124 of flowchart 120 encompasses display driver 110 deciding whether to repeat, reverse or modify the swirling motion of the electrical charged particles among pixels P00-P99. In one embodiment, it is assumed that a homogeneous distribution of the electrical charged particles among pixels P00-P99 does not exist prior to an initial execution of stage S122 and that a swirling motion of the electrically charged particles for a predetermined number of swirls in a fixed or varied direction will eventually achieve a movement of homogeneous batches of the electrically charged particles among pixels P00-P99 that results in a substantially homogeneous distribution of the electrically charged particles among pixels P00-P99 upon a termination of the swirling motion of the electrically charged particles among pixels P00-P99.

Figure 8:
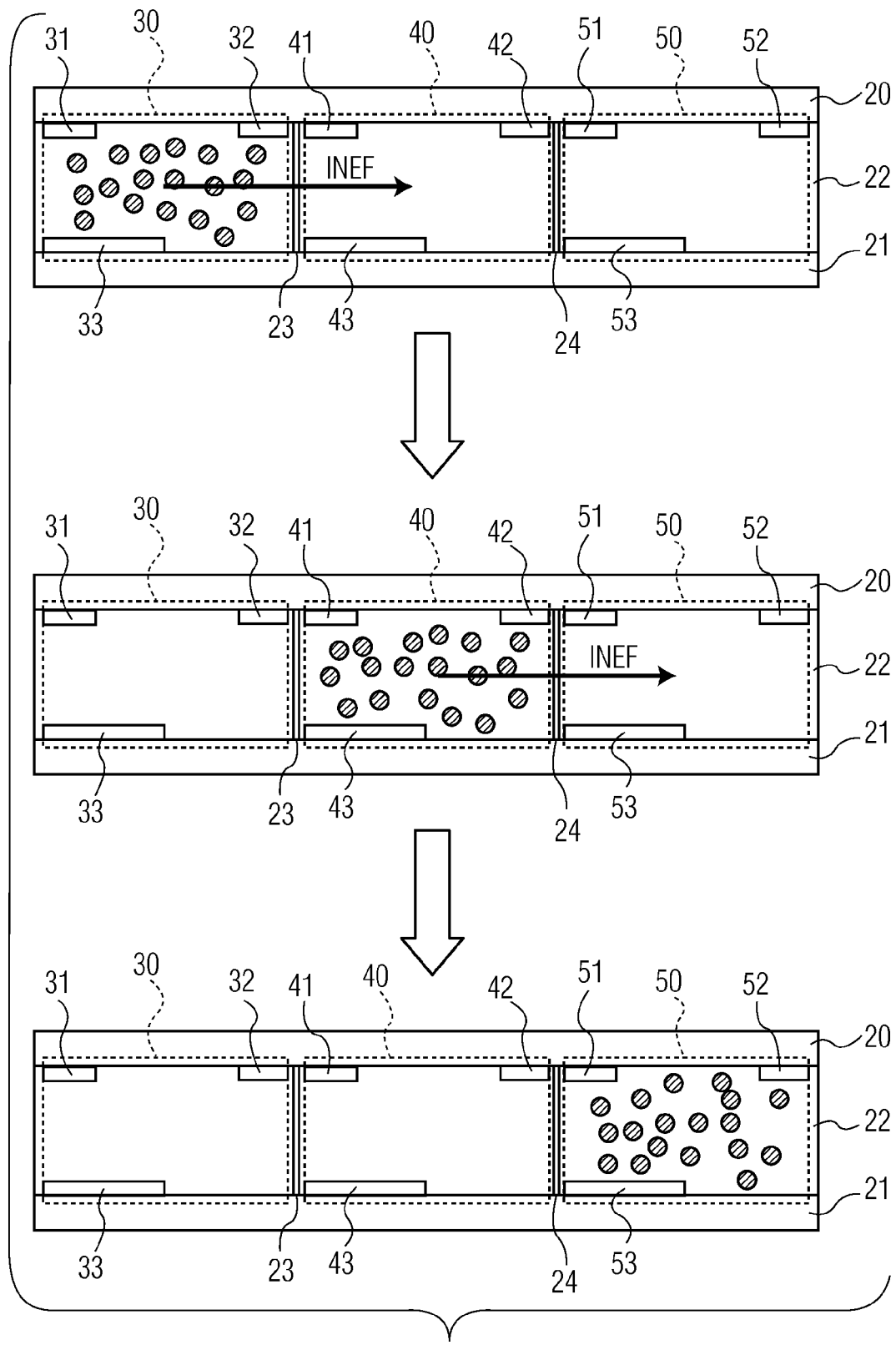
FIG. 8 illustrates an incorporation of a swirling object within the electrophoretic display illustrated in FIG. 4 in accordance with the present invention.

To enhance the swirling motion, swirling obstacles can be disposed within the electrophoretic suspension between display elements, such as, for example, swirling obstacles 23 and 24 shown in FIG. 8, in which like elements share like reference numbers with FIG. 4.

Figure 1:
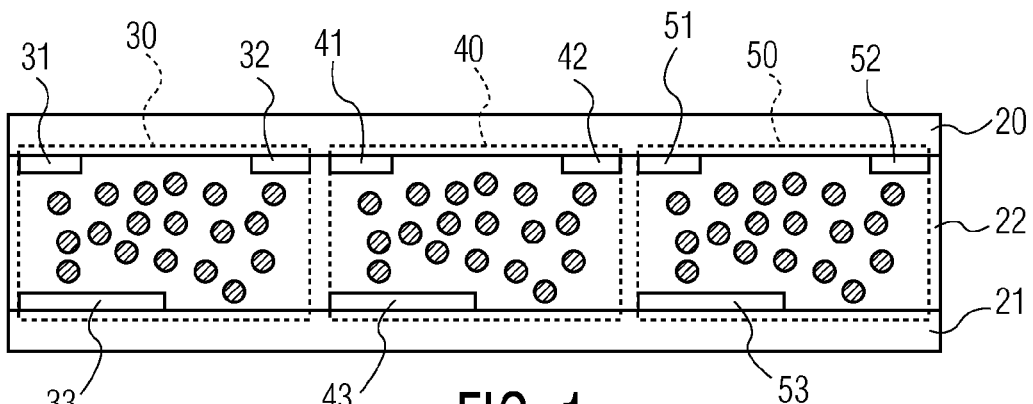
FIGS. 1 and 2 illustrate three (3) pixels of an electrophoretic display as known in the art.
Figure 2:
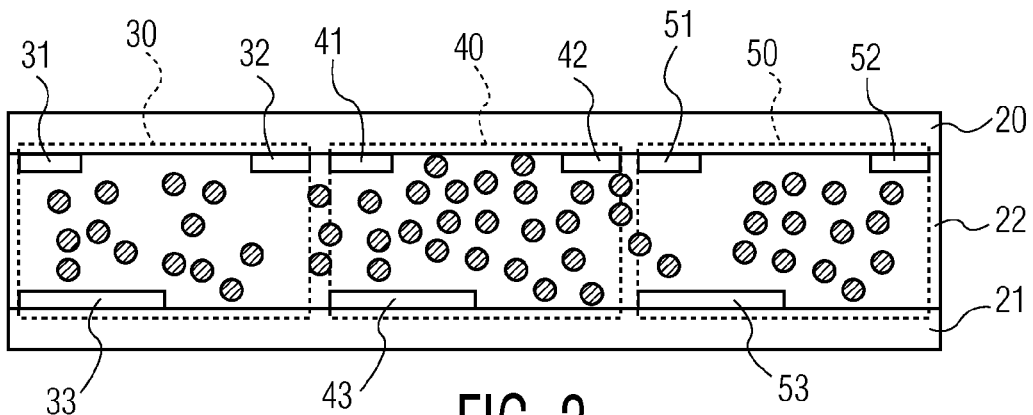
Figure 3:
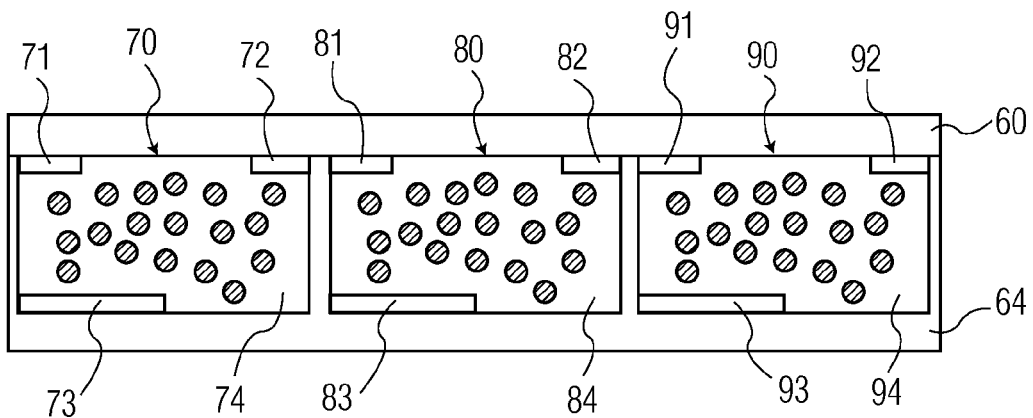
FIG. 3 illustrates three (3) microcups of an electrophoretic display as known in the art.
Figure 9:
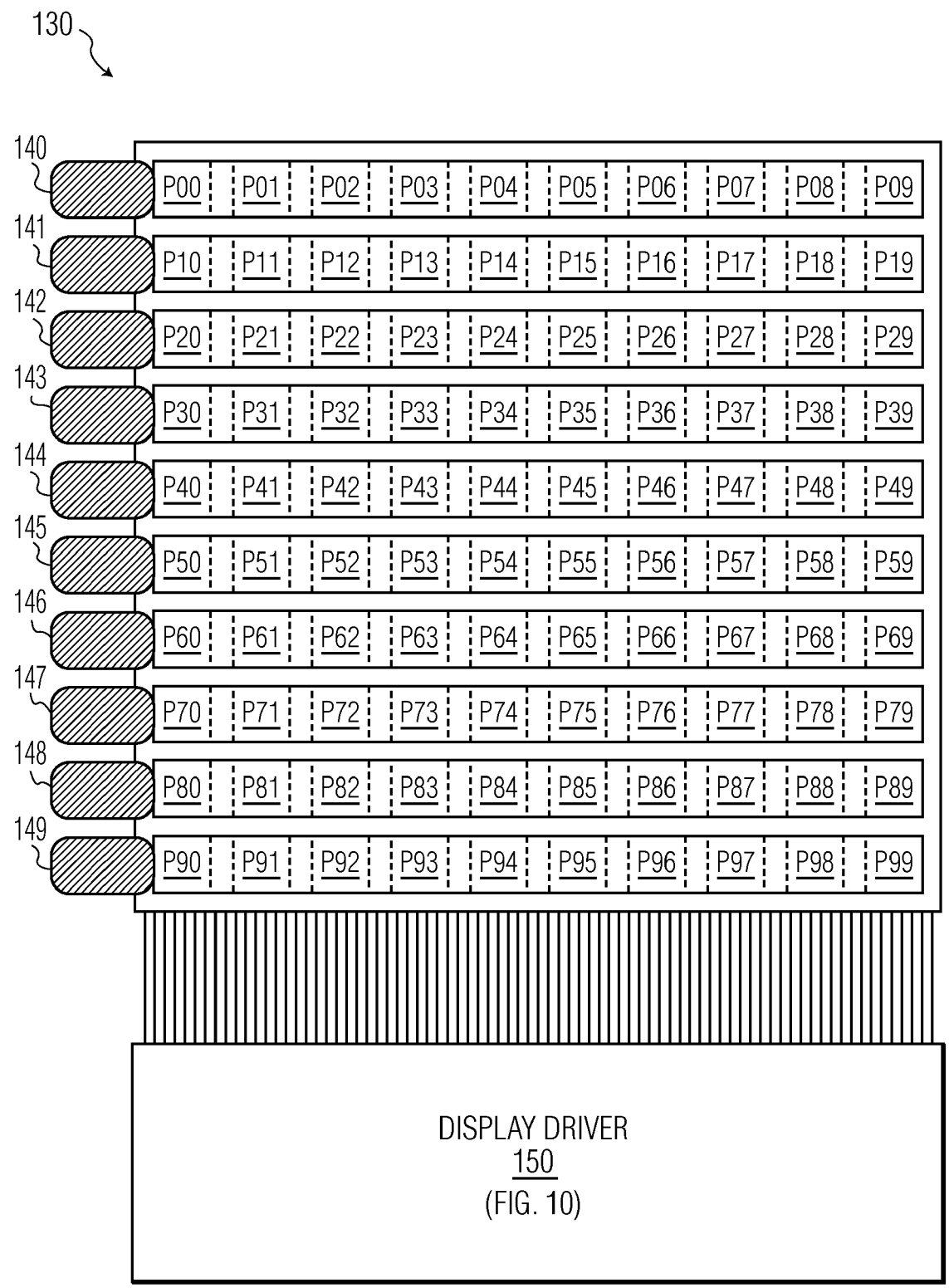
FIG. 9 illustrates a second embodiment of an electrophoretic display device in accordance with the present invention.

FIG. 9. illustrates an electrophoretic display 130 and a display driver 150. Electrophoretic display 130 employs a matrix of display elements in the form of pixels P00-P99 of any configuration as would be appreciated by those having ordinary skill in the art for supporting a generation of an in-line electric force of the present invention (e.g., pixel 30 shown in FIG. 4 and pixel 34 shown in FIG. 5). The matrix of display elements is separated by a physical barrier (e.g., walls shown in FIG. 3) or an electrical barrier via the electrodes into ten (10) distinct rows of display elements. Electrophoretic display 130 further includes ten (10) electrophoretic suspension reservoirs 140-149 with each electrophoretic suspension reservoir being in fluid communication with one of the rows of display elements.

Display driver 150 is in electrical communication with pixels P00-P99 via drive elements (not shown) as would be appreciated by those having ordinary skill in the art (e.g., transistors and capacitors). In operation, display driver 150 is structurally configured with hardware, software and/or firmware to implement a flowchart 160 illustrated in FIG. 10 that is representative of a linear motion homogeneous distribution method of the present invention for establishing a homogeneous distribution of electrically charged particles among pixels P00-P99.

Figure 10:
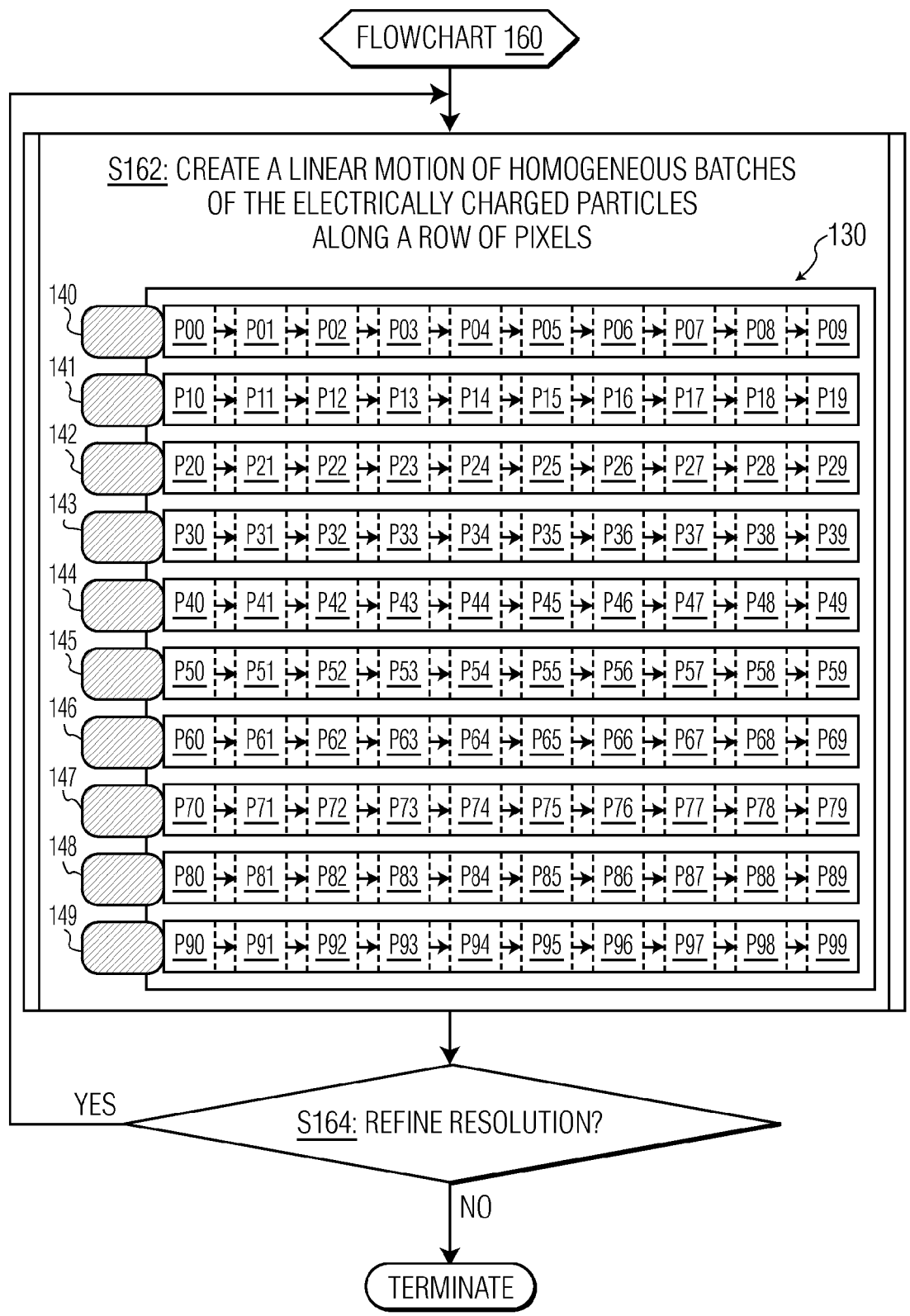
FIG. 10 illustrates a flowchart representative of a first embodiment of a linear motion particle homogenization method in accordance with the present invention.

Referring to FIG. 10, prior to an execution of stage S162 of flowchart 160, all of the electrically charged particles are contained within the electrophoretic suspension reservoirs 140-149 as shown in FIG. 10. At stage S162, display driver 150 creates a linear motion of the electrical charged particles along each row of pixels P00-P99 as exemplary illustrated by the linear motion arrows shown among the ten (10) pixel rows rings in electrophoretic display 130. To this end, in one embodiment, display driver 150 applies voltages to an electrode series of each pixel row in a manner that moves homogeneous batches of the electrically charged particles one on a single column basis as exemplarily shown in FIG. 11 where each column from right to left are sequentially filled or a multiple column basis as exemplarily shown in FIG. 12.

A stage S164 of flowchart 160 encompasses display driver 150 deciding whether to refine a resolution of pixels P00-P99. In one embodiment, the electrically charged particles can be redistributed in subgroups for each row, such as, for example, as shown in FIG. 13 where pixels P00-P04 form a 1st redistribution group; pixels P05-P09 form a 2nd redistribution group; pixels P10-P14 form a 3rd redistribution group; pixels P15-P19 form a 4th redistribution group; pixels P20-P24 form a 5th redistribution group; pixels P25-P29 form a 6th redistribution group; pixels P30-P34 form a 7th redistribution group; pixels P35-P39 form an 8th redistribution group; pixels P40-P44 form a 9th redistribution group; pixels P45-P49 form a 10th redistribution group; pixels P50-P54 form an 11th redistribution group; pixels P55-P59 form a 12th redistribution group; pixels P60-P64 form a 13th redistribution group; pixels P65-P69 form a 14th redistribution group; pixels P70-P74 form a 15th redistribution group; pixels P75-P79 form a 16th redistribution group; pixels P80-P84 form a 17th redistribution group; pixels P85-P89 form a 18th redistribution group; pixels P90-P94 form a 19th redistribution group, and pixels P95-P99 form a 20th redistribution group.

Figure 14:
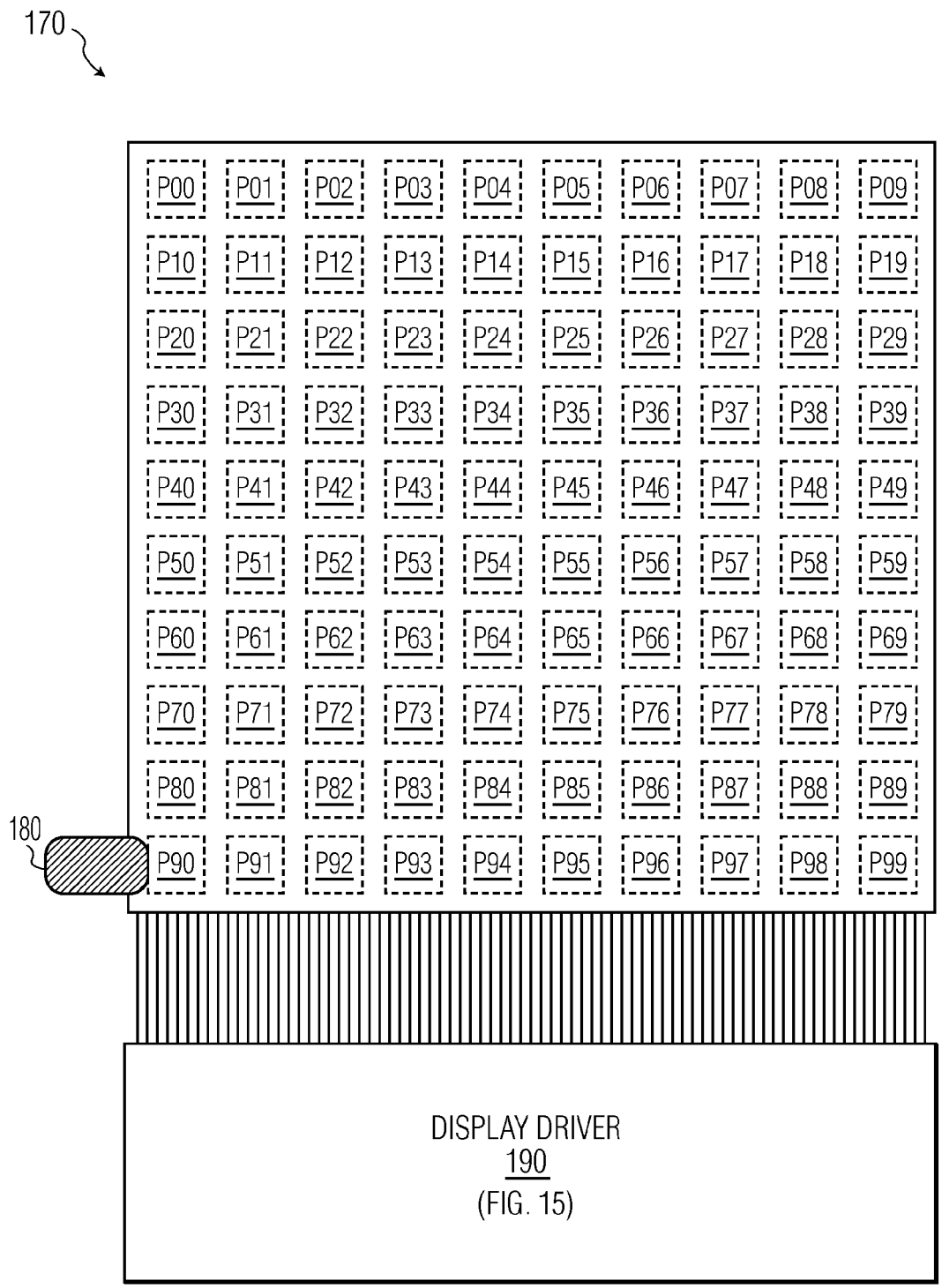
FIG. 14 illustrates a third embodiment of an electrophoretic display device in accordance with the present invention.
Figure 15:
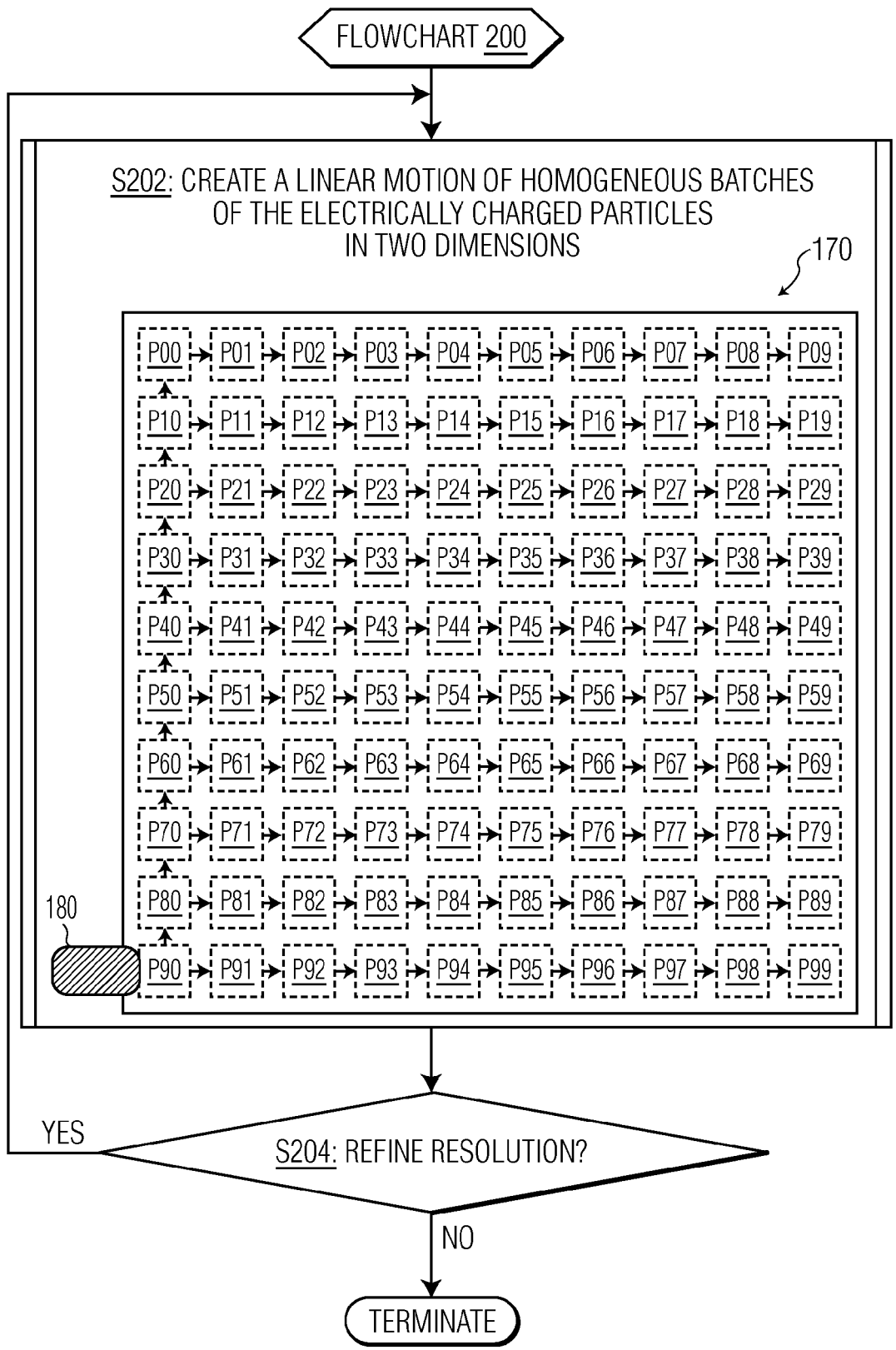
FIG. 15 illustrates a flowchart representative of a second embodiment of a linear motion particle homogenization method in accordance with the present invention.
Figure 16:
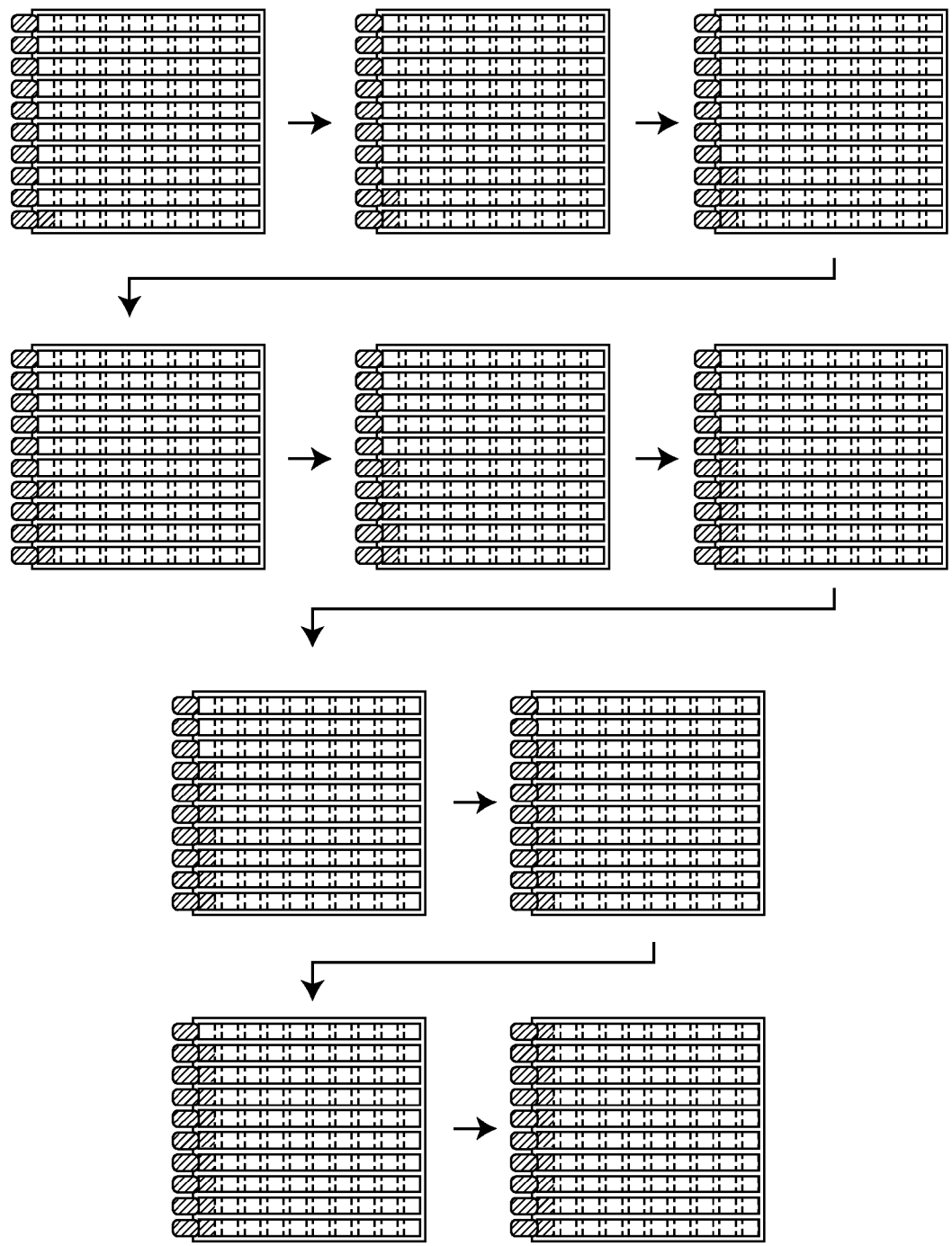
FIG. 16 illustrates an exemplary implementation of the flowchart illustrated in FIG. 15 in accordance with the present invention.

FIG. 14 illustrates an electrophoretic display 170 and a display driver 190. Electrophoretic display 170 employs a matrix of display elements in the form of pixels P00-P99 of any configuration as would be appreciated by those having ordinary skill in the art for supporting a generation of an in-line electric force of the present invention (e.g., pixel 30 shown in FIG. 4 and pixel 34 shown in FIG. 5). Electrophoretic display 170 further includes an electrophoretic suspension reservoir(s) 180 in fluid communication with pixels P00-P99.

Display driver 190 is in electrical communication with pixels P00-P99 via drive elements (not shown) as would be appreciated by those having ordinary skill in the art (e.g., transistors and capacitors). In operation, display driver 190 is structurally configured with hardware, software and/or firmware to implement a flowchart 200 illustrated in FIG. 15 that is representative of a linear motion homogeneous distribution method of the present invention for establishing a homogeneous distribution of electrically charged particles among pixels P00-P99.

Figure 11:
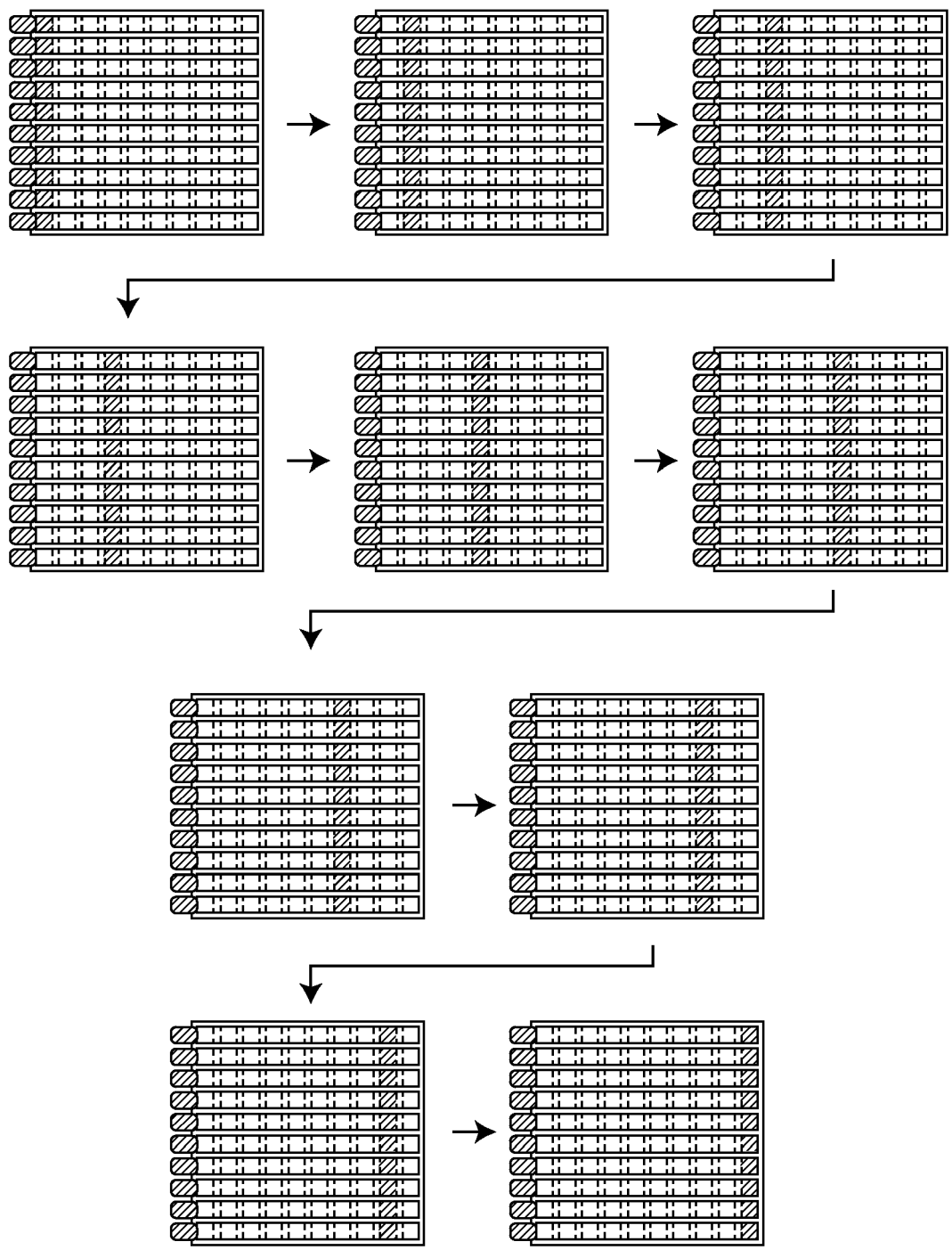
FIGS. 11 and 12 illustrate exemplary implementations of the flowchart illustrated in FIG. 10 in accordance with the present invention.
Figure 12:
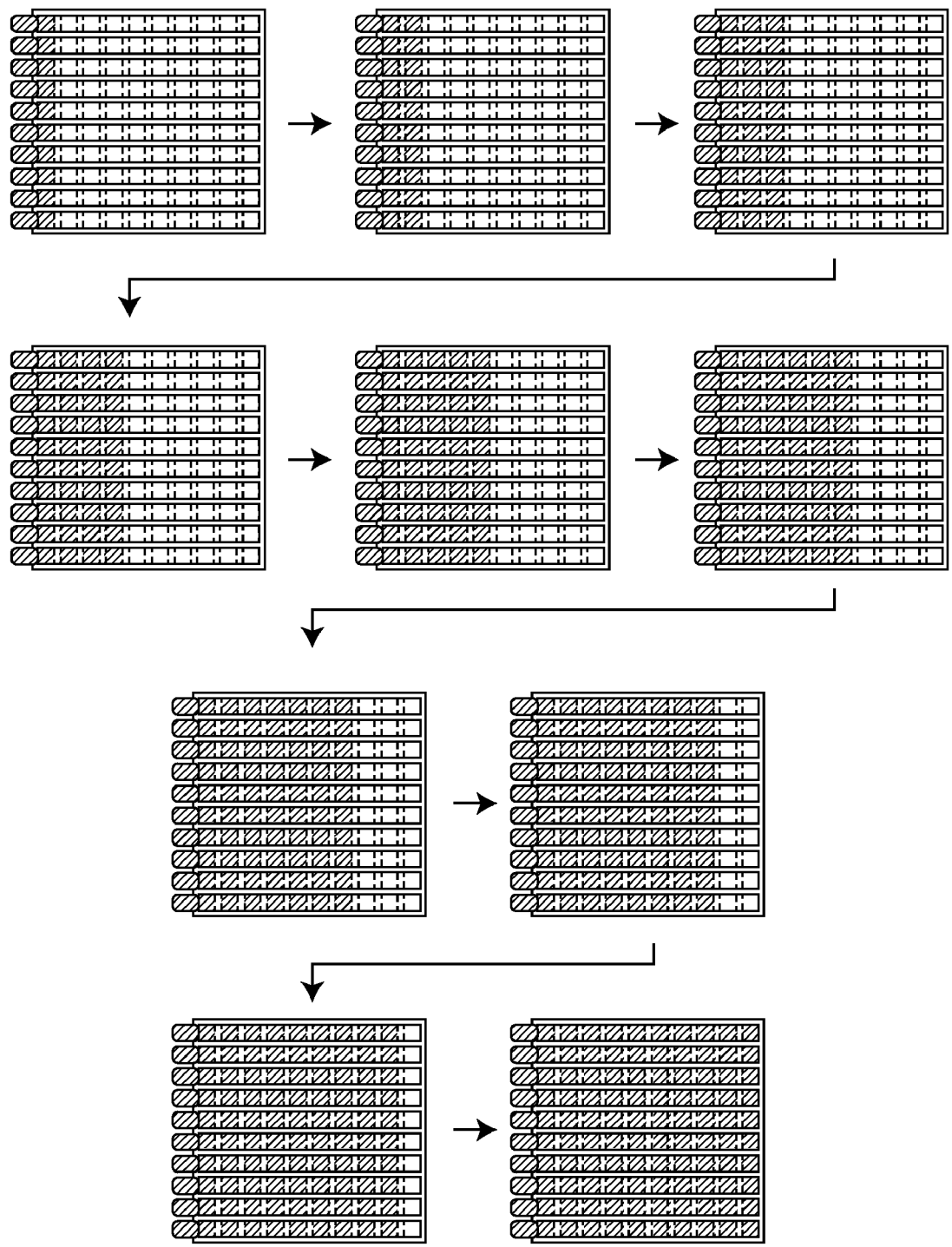

Referring to FIG. 14, prior to an execution of stage S202 of flowchart 200, all of the electrically charged particles are contained within the electrophoretic suspension reservoir(s) 180 as shown in FIG. 10. At stage S202, display driver 190 creates a linear motion of homogeneous batches of the electrical charged particles along the first column of pixels followed by a linear motion of the homogeneous batches of the electrically charged particles along each row as exemplary illustrated by the linear motion arrows shown in electrophoretic display 170. To this end, in one embodiment, display driver 190 applies voltages to an electrode series of each pixel in the first column in a manner that sequentially moves homogeneous batches of the electrically charged particles one on a single column basis as exemplarily shown in FIG. 16. Thereafter, display driver 190 applies voltages to an electrode series of each pixel row where each column from right to left are sequentially filled as shown in FIG. 11 or a multiple column basis as exemplarily shown in FIG. 12.

Figure 17:
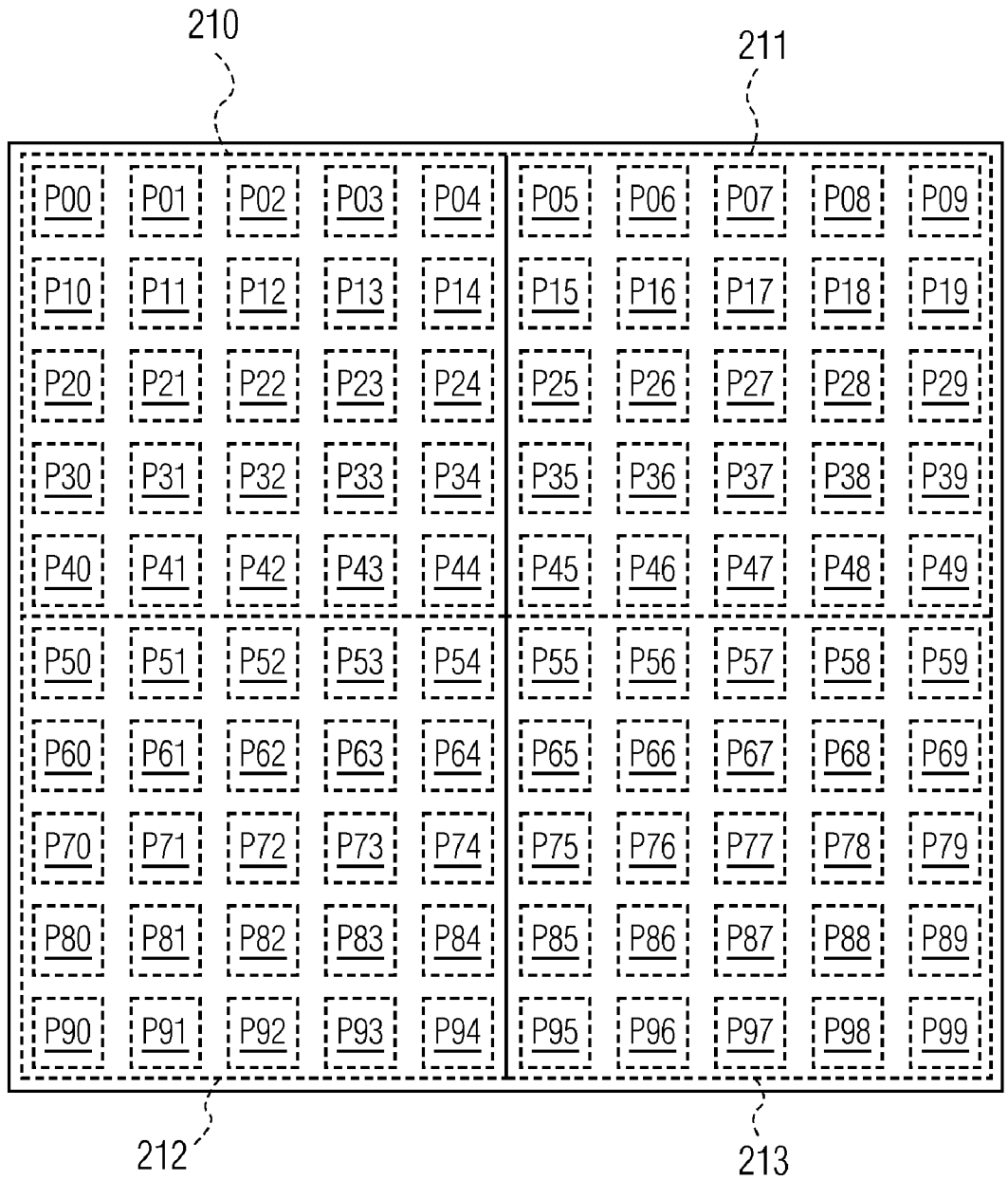
FIG. 17 illustrates an exemplary image resolution of the electrophoretic display illustrated in FIG. 14 in accordance with the present invention.

A stage S204 of flowchart 200 encompasses display driver 190 deciding whether to refine a resolution of pixels P00-P99. In one embodiment, the electrically charged particles can be redistributed in blocks, such as, for example, a blocks 210, 211, 212 and 213 shown in FIG. 17.

Referring to FIGS. 4-17, those having ordinary skill in the art will appreciate numerous advantages of the present invention including, but not limited to, providing an in-plane electrophoretic display that will remain substantially homogeneous during operation over its life time and a fabrication of hermetically sealed pixels of the display that are filled with minimal, if any, presence of air bubbles.

The scope of the present invention is indicated in the appended claims, and all changes that come within the meaning and range of equivalents are intended to be embraced therein.

Although this invention has been described with reference to particular embodiments, it will be appreciated that many variations will be resorted to without departing from the spirit and scope of this invention as set forth in the appended claims. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof, f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

The invention claimed is:

1. An electrophoretic display device, comprising:
   an electrophoretic display including a matrix of display elements; and
   a display driver in electrical communication with the display elements wherein the display to driver is operable to establish a homogenous distribution of electrically charged particles among the display elements based on at least one generation of an in-plane electric force for moving a homogeneous batch of electrically charged particles between at least two display elements.

2. The electrophoretic display device of claim 1, wherein each display element is a pixel defined by at least two in-plane electrodes within an electrophoretic suspension between a top substrate and a bottom substrate.

3. The electrophoretic display device of claim 1, wherein the at least one in-plane electric force creates a swirling motion of the homogeneous batch of electrically charged particles between the at least two display elements.

4. The electrophoretic display device of claim 3, wherein the electrophoretic display further includes:
   a swirling obstacle disposed between the at least two display elements to enhance the swirling motion of the homogeneous batch of electrically charged particles between the at least two display elements.

5. The electrophoretic display device of claim 1, wherein the at least one in-plane electric force creates a one-dimensional linear motion of the homogeneous batch of electrically charged particles between the at least two display elements.

6. The electrophoretic display device of claim 1, wherein the at least one in-plane electric force creates a two-dimensional linear motion of the homogeneous batch of electrically charged particles between the at least two display elements.

7. The electrophoretic display device of claim 1, wherein the display driver is further operable to refine a resolution of the display elements subsequent to establishing a homogenous distribution of electrically charged particles among the display elements.

8. An electrophoretic display device, comprising:
   an electrophoretic display including:
       a matrix of display elements; and
       an electrophoretic suspension reservoir of electrically charged particles in fluid communication with at least one display element; and
   a display driver in electrical communication with the display element wherein the display to driver is operable to establish a homogenous distribution of the electrically charged particles among the display elements based on at least one generation of an in-plane electric force for moving a homogeneous batch of electrically charged particles between the electrophoretic suspension reservoir and at least one display element.

9. The electrophoretic display device of claim 8, wherein each display element is a pixel defined by at least two in-plane electrodes within an electrophoretic suspension between a top substrate and a bottom substrate.

10. The electrophoretic display device of claim 8, wherein the at least one in-plane electric force creates a one-dimensional linear motion of the homogeneous batch of electrically charged particles between the electrophoretic suspension reservoir and the at least one display element.

11. The electrophoretic display device of claim 8, wherein the at least one in-plane electric force creates a two-dimensional linear motion of the homogeneous batch of electrically charged particles between the electrophoretic suspension reservoir and the at least one display element.

12. The electrophoretic display device of claim 8, wherein the display driver is further operable to refine a resolution of the display elements subsequent to establishing a homogenous distribution of electrically charged particles among the display elements.

13. The electrophoretic display device of claim 8, wherein the electrophoretic suspension reservoir of electrically charged particles is in fluid communication exclusively with the matrix of display elements.

14. The electrophoretic display device of claim 8, wherein the electrophoretic suspension reservoir of electrically charged particles is in fluid communication exclusively with a line of the matrix of display elements.

15. The electrophoretic display device of claim 8, wherein the electrophoretic suspension reservoir of electrically charged particles is in fluid communication exclusively with a cluster of the matrix of display elements.

\* \* \* \* \*